United States Patent
Kajiwara et al.

(10) Patent No.: US 7,454,031 B2
(45) Date of Patent: Nov. 18, 2008

(54) MULTIFUNCTION SPEAKER

(75) Inventors: Hiroo Kajiwara, Yamanashi-ken (JP); Kazumi Miyamoto, Yamanashi-ken (JP)

(73) Assignee: Citizen Electronics Co., Ltd., Fujiyoshida-shi, Yamanashi-ken (JP)

( * ) Notice: Subject to any disclaimer, the term of this patent is extended or adjusted under 35 U.S.C. 154(b) by 632 days.

(21) Appl. No.: 11/079,103

(22) Filed: Mar. 15, 2005

(65) Prior Publication Data
US 2005/0207610 A1    Sep. 22, 2005

(30) Foreign Application Priority Data
Mar. 18, 2004    (JP)    ............................. 2004-077672

(51) Int. Cl.
*H04R 25/00*    (2006.01)
(52) U.S. Cl. ........................ 381/396; 381/396; 381/189; 381/191; 381/430
(58) Field of Classification Search ................. 381/396, 381/430
See application file for complete search history.

(56) References Cited

U.S. PATENT DOCUMENTS

| | | | | |
|---|---|---|---|---|
| 5,956,622 | A * | 9/1999 | Lee ............................. | 340/7.6 |
| 6,529,611 | B2 * | 3/2003 | Kobayashi et al. .......... | 381/396 |
| 7,224,090 | B2 * | 5/2007 | Oh et al. ....................... | 310/14 |

* cited by examiner

*Primary Examiner*—Suhan Ni
*Assistant Examiner*—Jasmine Pritchard
(74) *Attorney, Agent, or Firm*—Dennison, Schultz & MacDonald

(57) ABSTRACT

A multifunction speaker has a frame made of an insulation material and having a cylindrical portion, a pair of supporting springs secured to the frame and to a magnetic circuit for supporting the magnetic circuit. The magnetic circuit comprises a pole piece having a center pole and a flange on which an annular magnet is mounted. The flange of the pole piece has a pair of positioning projections projected from a periphery of the flange for positioning the magnet.

4 Claims, 3 Drawing Sheets

MULTIFUNCTION SPEAKER

BACKGROUND OF THE INVENTION

The present invention relates to a multifunction speaker used in a mobile transmission instrument such as a portable telephone and pager. The multifunction speaker is provided with a sound emanating function and vibrating function device for informing a user when a calling signal is applied.

A conventional mobile transmission instrument such as a portable telephone is generally adapted to change the operation thereof from generating buzzer sounds and melodies to vibrating a case of the instrument without producing sounds for informing the user of a calling signal. In order to achieve that kind of operation, a small speaker for generating sounds and a vibrating device in which an eccentric weight is vibrated by the rotation of a small motor are provided separately in a mobile transmission instrument. However, incorporating both the speaker and the vibrating device in the instrument is disadvantageous in rendering the instrument compact and inexpensive. Thus, there has been provided a multifunction speaker capable of generating both the sounds and the vibration within a single device such as that described in FIG. 1 and pages 3 to 4 in the specification of Japanese Patent Application Laid-Open 2001-231096.

FIG. 5a is a plan view of that kind of conventional multifunction speaker mentioned above, and FIG. 5b is a sectional view taken along a line V-V of FIG. 5a.

Referring to FIGS. 5a and 5b, a case of the multifunction speaker comprises an upper frame 22 and a lower frame 21 made of resin and houses a magnetic circuit 23 therein. The magnetic circuit 23 comprises a pole piece 24 made of a magnetic material and having a center pole 24a and a flange 24b, annular magnet 25 made of such a material as samarium-cobalt attached to the flange 24b by such a means as adhesive, and an annular magnetic top plate 26 adhered to the magnet 25.

An upper supporting spring plate 27 is attached to the upper frame 22 by means such as adhesive and insert molding. The inner periphery of the spring plate 27 is attached on the outer edge of the top plate 26 by point welding and other means thereby to resiliently support the top plate 26. A part of the spring plate 27 is extended beyond the case to form a ground terminal 27a. The ground terminal 27a is provided to conduct static electric charges in the magnetic circuit 23 harmlessly to earth so as to prevent damage caused by electrostatic discharge.

The magnetic circuit 23 is further supported by a lower spring plate 28. More particularly, the outer periphery of the lower spring plate 28 is securely attached to the lower frame 21 and the inner periphery is securely attached to the pole piece 24 by point welding, for example.

A diaphragm 29 is mounted on the inner periphery of the upper frame 22 at the outer periphery thereof. A cylindrical coil 30 which is secured to a lower part of the diaphragm 29 is inserted in a magnetic gap formed between the outer periphery of the center pole 24a and the inner periphery of the top plate 26. The ends of the coil 30 is connected by solders to a pair of terminals 31 provided on the upper frame 22 for connecting the coil 30 to an external circuit. A magnetic ring 32 is further provided in the case for shielding the magnetic circuit 23 so that the generated magnetic field is prevented from leaking out of the case.

In operation, when a driving signal of audio frequency is applied to the coil 30 through the terminals 31, the cylindrical coil 30 alternatively generates an electromagnetic force to vibrate the diaphragm 29, thereby to generate sounds. When the frequency of the applied signal is low, while no sound is generated from the diaphragm 29, the magnetic circuit 23 supported by the upper and lower spring plates 27 and 28 is mechanically vibrated. The vibration is transmitted through the case to the equipment in which the multifunction speaker is housed so that the user is able to feel the vibration and be informed of a phone call.

In the conventional multifunction speaker, when mounting the magnet 25 on the flange 24b of the pole piece 24, since there is no positioning guide for the magnet, the magnet tends to be diverged from the adhering position. In addition, there is a problem that the magnet and the pole piece often come apart during a drop shock test.

SUMMARY OF THE INVENTION

An object of the present invention is to provide a multifunction speaker where the magnet is accurately positioned and securely mounted on the pole piece.

According to the present invention, there is provided a multifunction speaker comprising, a frame made of an insulation material and having a cylindrical portion, at least one supporting spring secured to the frame at an peripheral portion thereof, a magnetic circuit comprising a pole piece having a center pole and a flange on which an annular magnet is mounted, and the magnetic circuit forming a magnetic gap and resiliently supported in the frame by the supporting spring at an inner portion thereof, a diaphragm secured to the frame at a peripheral edge thereof, a coil secured to a lower part of the diaphragm and inserted in the magnetic gap, wherein the flange of the pole piece has a pair of positioning projections projected from a periphery of the flange.

In an aspect of the present invention, the center pole of the pole piece has a cylindrical shape, and the positioning projections are radially and axially projected on a centerline of the pole piece so that each of the positioning projections opposes each other and has an arcuated inside wall concentrical with the center pole.

These and other objects and features of the present invention will become more apparent from the following detailed description with reference to the accompanying drawings.

BRIEF DESCRIPTION OF DRAWINGS

FIG. 5b is a sectional view taken along a line V-V of FIG. 5a.

DETAILED DESCRIPTION OF THE PREFERRED EMBODIMENT

Figure 1:
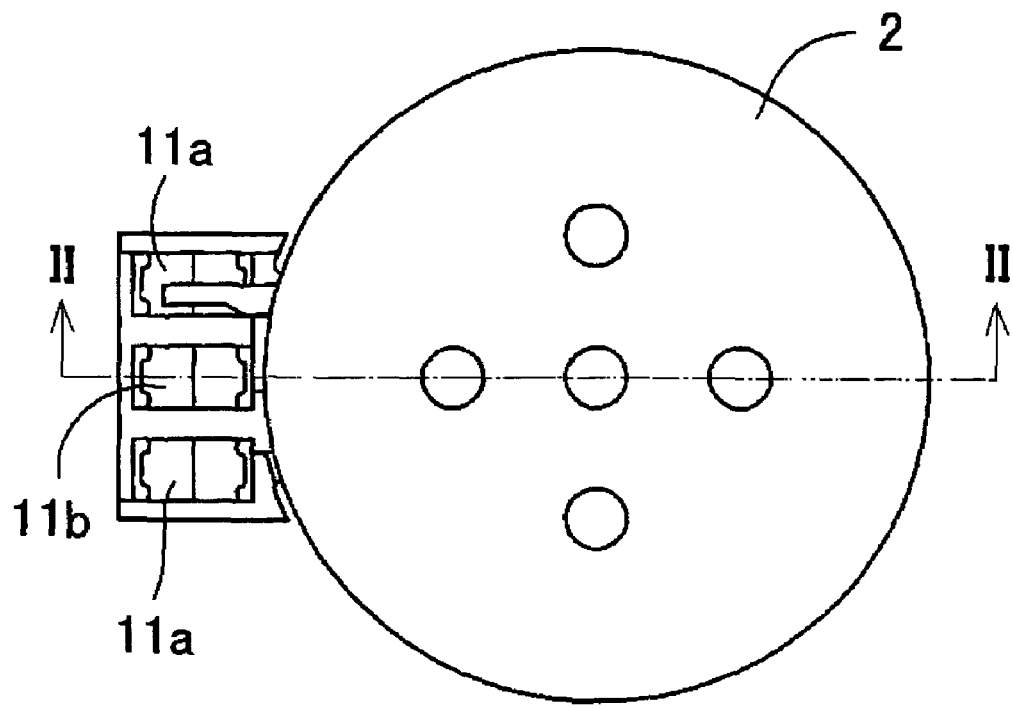
FIG. 1 is a plan view showing an embodiment of a multifunction speaker according to the present invention.
Figure 3:
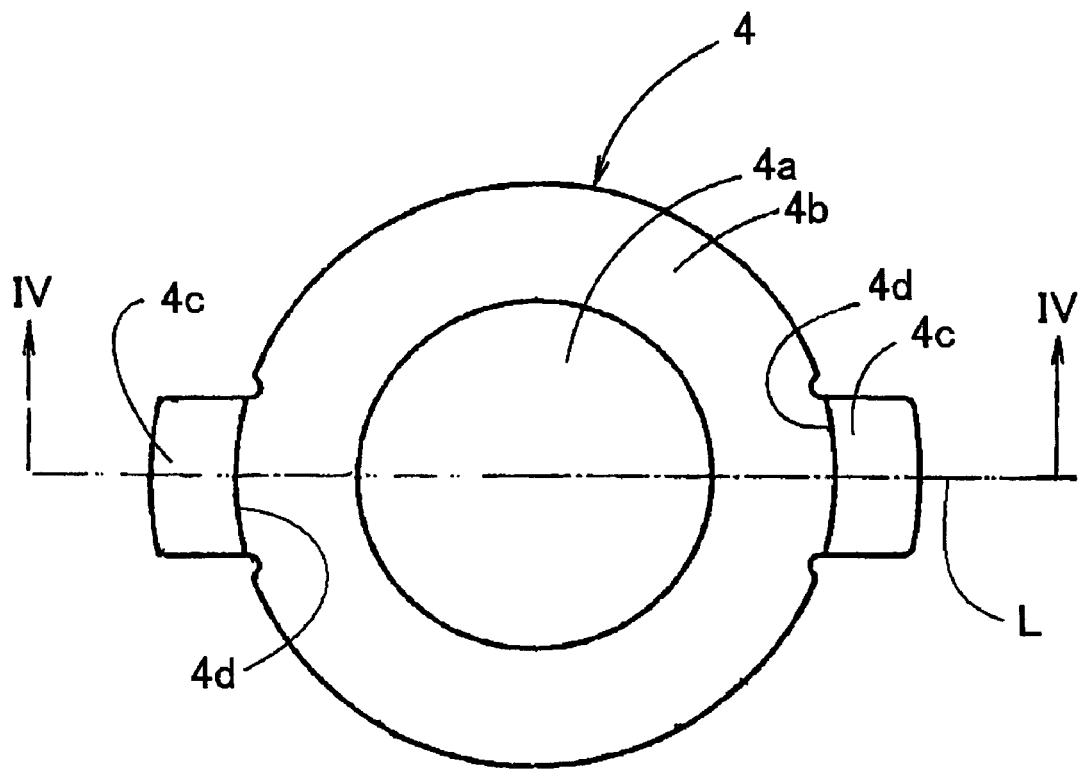
FIG. 3 is a plan view of a pole piece provided in the multifunction speaker of FIG. 1.
Figure 4:
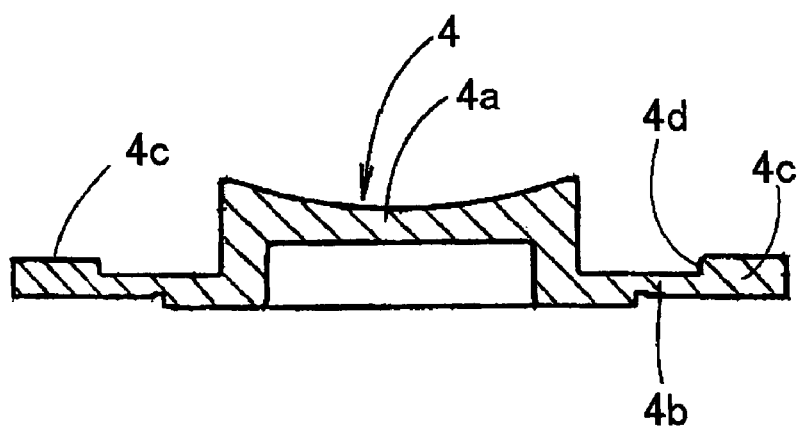
FIG. 4 is a sectional view taken along a line IV-IV of FIG. 3.
Figure 5A:
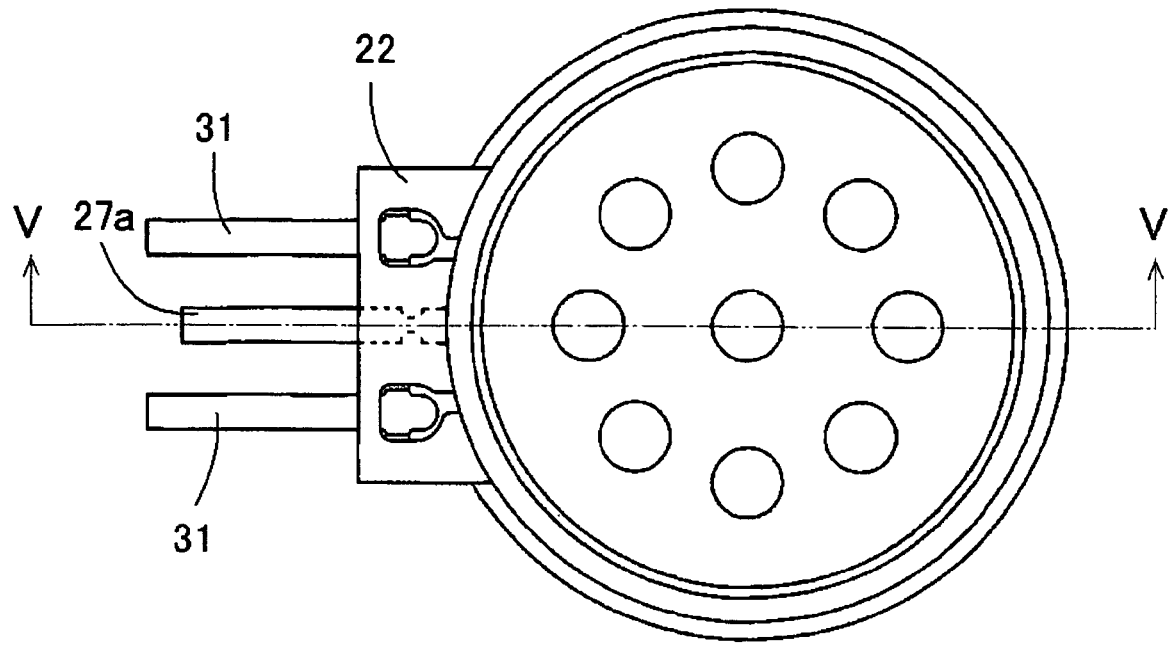
FIG. 5a is a plan view showing an example of a conventional multifunction speaker.
Figure 5B:
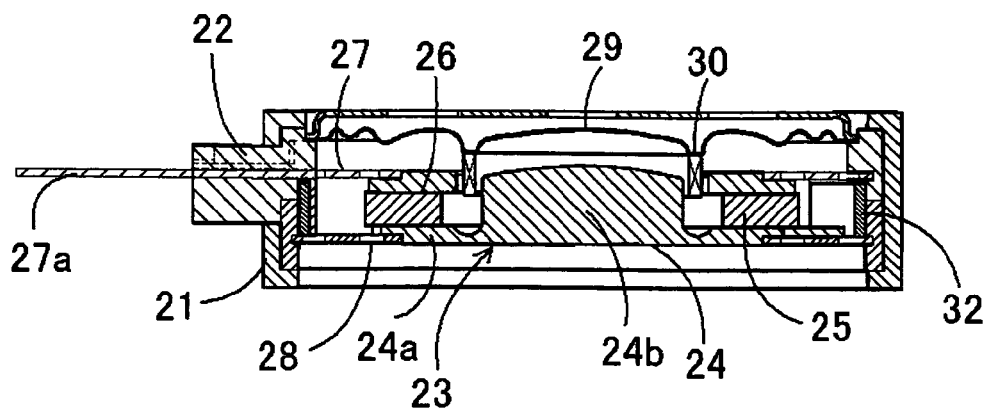

An embodiment of the present invention is described hereinafter. FIG. 1 is a top plan view showing an embodiment of a multifunction speaker according to the present invention, FIG. 2 is a sectional view taken along a line II-II of FIG. 1, FIG. 3 is a plan view of a pole piece provided in the multifunction speaker of FIG. 1, and FIG. 4 is a sectional view taken along a line IV-IV of FIG. 3.

Figure 2:
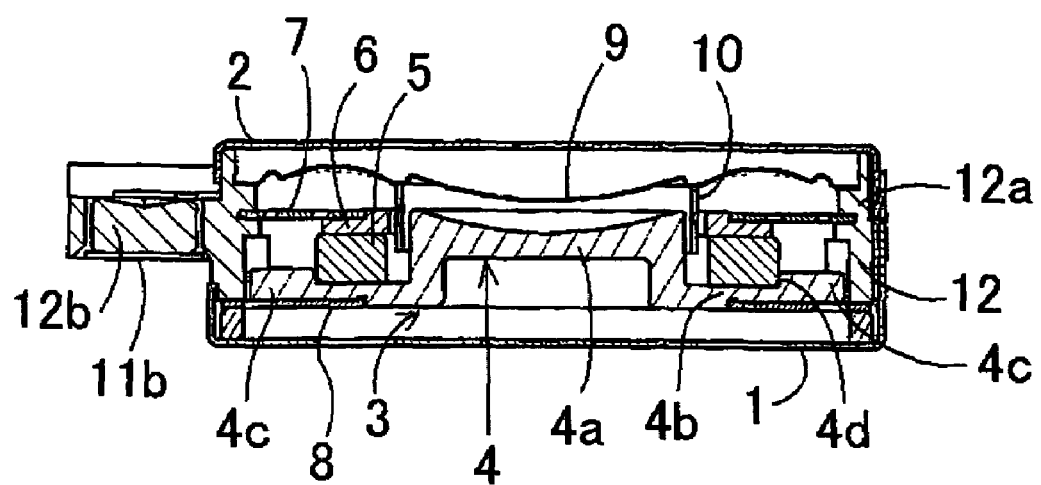
FIG. 2 is a sectional view taken along a line II-II of FIG. 1.

Referring to FIGS. 1 to 2, an embodiment of multifunction speaker according to the present invention has a substantially cylindrical frame 12 made of resin in which a magnetic circuit 3 is provided. The frame 12 has a cylindrical portion 12a and a terminal-supporting portion 12b outwardly projected from the cylindrical portion 12a.

An upper supporting spring 7 such as a spring plate is mounted on the cylindrical portion 12a and attached thereto by an adhesive or by injection molding, and a lower supporting spring 8 such as a spring plate is attached to an underside of the frame 12.

On the lower supporting spring 8, a pole piece 4 made of a magnetic material and having a cylindrical center pole 4a and a flange 4b is mounted and adhered thereto by point welding. An annular magnet 5 having a top surface, an outer periphery, and an underside, and made of such a material as samarium-cobalt is securely mounted on the flange 4b by an adhesive and an annular top plate 6 made of a magnetic material is securely mounted on the top surface of the annular magnet 5, thereby forming the magnetic circuit 3. The inner periphery of the upper supporting spring 7 is adhered to the outer edge of the annular top plate 6 by point welding and other means, thereby to support the annular top plate 6. Accordingly, the magnetic circuit 3 is resiliently supported in the frame 12 by the first and second supporting springs 7 and 8.

Referring to FIGS. 3 and 4, the flange 4b of the pole piece 4 is provided with a pair of positioning projections 4c for positioning the annular magnet 5. The positioning projections 4c are radially and axially projected on a centerline L of the pole piece 4 so that each of the positioning projections 4c-opposes each other and has an arcuated inside wall 4d which has the same central axis as those of the center pole 4a and the annular magnet 5. The annular magnet 5 is mounted on the flange 4b and the underside of the annular magnet is adhered to the flange 4b and also, the outer periphery of the annular magnet is adhered to the inside walls 4d of the projections 4c projecting from the peripheral portions of the flange. Since the adhering area of the annular magnet 5 to the flange of the pole piece 4 is three-dimensional and is increased, the adhesive force is improved.

A diaphragm 9 is mounted on the frame 12 at the outer periphery thereof and a cylindrical coil 10 which is securely attached on the underside of the diaphragm 9 is inserted in a magnetic gap formed between the outer periphery of the center pole 4a and the inner periphery of the top plate 6.

A cylindrical upper protector 2 made of resin and having a plurality of sound emanating holes is mounted on the frame 12, and a cylindrical lower protector 1 also made of resin and having a plurality of vents is mounted on the lower portion of the frame 12.

A pair of positive and negative terminals 11a and a ground terminal 11b are formed on the terminal supporting portion 12b. The positive and negative terminals 11a are connected to ends of the coil 10 by solders, and the ground terminal 11b is connected to the magnetic circuit 3.

In operation, when a driving signal of audio frequency is applied to the cylindrical coil 10 through the terminals 11a, the coil 10 generates an electromagnetic force to vibrate the diaphragm 9, thereby to generate sounds. When the audio frequency of the applied signal is low, while no sound is generated from the diaphragm 9, the magnetic circuit 3 is mechanically vibrated. The vibration is transmitted through the case to the equipment in which the multifunction speaker is housed so that the user is able to feel the vibration and be informed of a phone call.

During the assembling of the multifunction speaker, since the positioning projections 4c are provided on the peripheral part of the flange 4b of the pole piece 4, the positioning of the annular magnet 5 is facilitated. Moreover, since the outer periphery as well as the underside of the annular magnet 5 is adhered to the pole piece 4, the adhering area of the annular magnet 5 to the flange is enlarged so that the adhesive force is increased.

From the foregoing it will be understood that the present invention provides a multifunction speaker where the magnet is accurately and easily positioned at assembling, and the magnet is prevented from displacing when a shock is applied.

While the invention has been described in conjunction with preferred specific embodiment thereof, it will be understood that this description is intended to illustrate and not limit the scope of the invention, which is defined by the following claims.

What is claimed is:

1. A multifunction speaker comprising:
   a frame made of an insulation material and having a cylindrical portion;
   at least one supporting spring secured to the frame at an outer peripheral portion thereof;
   a magnetic circuit comprising a pole piece having a center pole and a flange having positioning projections axially projecting from peripheral portions of the flange, the magnetic circuit further comprising an annular magnet positioned around the center pole and mounted on a surface of the flange, and an annular top plate mounted on the annular magnet and configured to form a magnetic gap between the center pole and the annular top plate, the magnetic circuit being resiliently supported in the frame by the supporting spring;
   a diaphragm secured to the frame at an outer peripheral edge thereof and having a surface opposing the magnetic circuit;
   a coil secured to a surface of the diaphragm and inserted in the magnetic gap;
   wherein the positioning projections each have an inside surface configured to be adhesively engaged with an outer periphery of the annular magnet, and the annular magnet is configured to be positioned by the inside surfaces of the positioning projections.

2. The multifunction speaker according to claim 1 wherein the positioning projections comprise a pair of the projections opposing each other at a periphery of the flange.

3. The multifunction speaker according to claim 2 wherein the center pole of the pole piece has a cylindrical shape and the pair of projections are diametrically opposite each other and the inside surfaces of the projections are in the shape of a circular arc which is configured to fittingly engage with the outer periphery of the annular magnet.

4. The multifunction speaker according to claim 3 wherein the annular magnet is adhered to the surface of the flange.

* * * * *